United States Patent Office 3,337,795
Patented Aug. 22, 1967

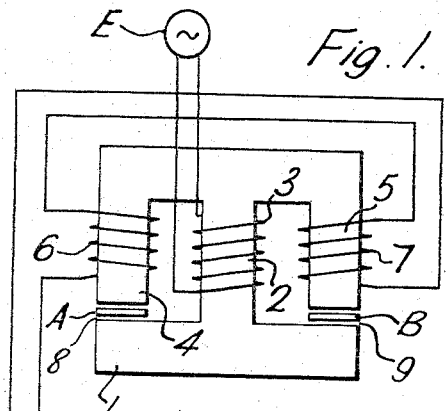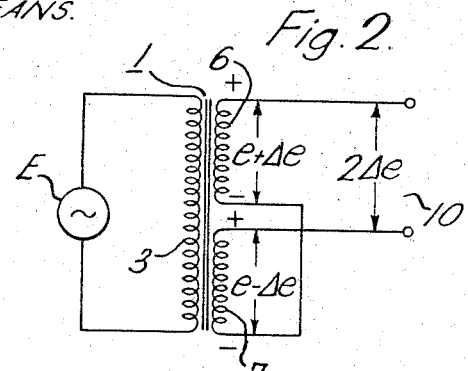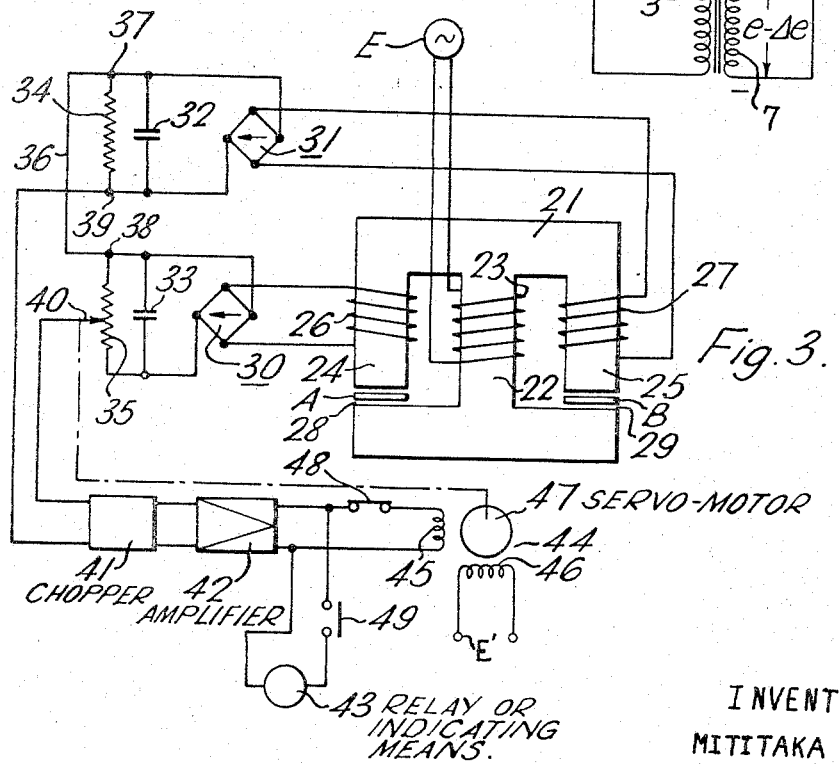

3,337,795
METHOD AND APPARATUS FOR TESTING PRINTED MATTER USING DIFFERENTIAL TRANSFORMER
Mititaka Yamamoto, Mikio Uemura, and Hiroshi Marubayashi, Kyoto, Japan, assignors to Tateisi Electronics Co., Kyoto, Japan, a corporation of Japan
Filed Sept. 21, 1964, Ser. No. 397,968
Claims priority, application Japan, Sept. 23, 1963, 38/51,134
1 Claim. (Cl. 324—34)

ABSTRACT OF THE DISCLOSURE

A method and the associated apparatus for testing printed matter by comparing the magnetic characteristics of the ink used in the printing on an unknown document to the magnetic characteristics of the ink on a known document are described. A differential transformer having first and second air gaps and sensing windings associated with each gap is so arranged that when the transformer is energized output signals in the two sensing windings will be provided with the same being proportional respectively to the magnetic characteristics of the ink on a known and on an unknown document respectively positioned in the two gaps.

---

This invention relates to apparatus for testing printed matter and more particularly to apparatus for distinguishing between articles printed with ink containing magnetic material in a predetermined range of quantity and those printed with ink containing no such material, or a larger or smaller amount of it than the predetermined range.

There are various kinds of printing ink, among which those of high quality contain particles of a metal or metals to improve its covering or hiding power and durability. Among such metals there are magnetic substances such as iron, nickel, cobalt, chrome, etc. If a piece of paper or the like, such as a bond or document, is printed with ink containing such magnetic material, the material can be relied upon as a test for identifying the printed paper as such.

It is therefore one object of the invention to provide a new and improved apparatus capable of identifying articles printed with ink containing magnetic material.

Another object of the invention is to provide a new and improved apparatus capable of distinguishing between articles printed with ink containing a predetermined quantity or range of quantity of magnetic material and those printed with ink containing no such material or a larger or smaller quantity of it than the predetermined quantity or range of quantity.

Other objects and characteristics of the invention will become apparent from the following description of preferred embodiments thereof with reference to the accompanying drawings, wherein:

FIG. 1 is a diagrammatic illustration of one embodiment of the invention;

FIG. 2 is an equivalent circuit for the differential transformer shown in FIG. 1; and FIG. 3 is a diagrammatic illustration of another embodiment of the invention.

In the following description, when an object or article to be tested by the apparatus of the invention contains magnetic material in a quantity within a predetermined range, it will be referred to as being "genuine." Otherwise, it will be referred to as being "false."

Referring first to FIGS. 1 and 2, there is shown a differential transformer 1 comprising a middle core leg 2 having an exciting winding around it and a pair of side core legs 4 and 5 having output windings 6 and 7 wound thereon, respectively. The winding 3 is connected to a suitable alternating current source E, and the windings 6 and 7 are serially connected and so wound on their respective core legs 4 and 5 that their outputs are opposite in polarity. Air-gaps 8 and 9 are formed in the core legs 4 and 5, respectively.

When the winding 3 is energized, the flux produced passes through both core legs 4 and 5 of the transformer. Suppose that both windings 6 and 7 have the same number of turns and that the core legs 4 and 5 have the same magnetic reluctance. Then, the voltages induced in the output windings 6 and 7 are of the same value and are offset so that there will appear no voltage across terminals 10.

Suppose that a standard or reference article A, for example, a piece of paper printed with ink containing a predetermined amount of magnetic material and an object to be tested B, for example, a piece of paper printed with an unknown ink are placed in the air-gaps 8 and 9, respectively, or passed therethrough at the same speed. If the ink used in the object B is of the same nature, that is, contains substantially the same amount of the material, as the ink used in the article A, the magnetic reluctances of the two core legs 4 and 5 will decrease substantially equally, so that the voltages induced in the windings 6 and 7 will increase substantially equally, resulting in a zero voltage across the terminals 10. On the other hand, if the ink used in the object under test differs from that used in the reference article, that is, if it contains no magnetic material, the magnetic reluctance of the air-gap 9 changes very little in comparison with that of the air-gap 8. Thus, if the voltage induced in the output winding 6 increases by $\Delta e$, the voltage induced in the other output winding 7 will decrease by $\Delta e$, so that a voltage equal to the amount of $2\Delta e$ will appear between the terminals 10 in accordance with the principle of operation of the differential transformer. It will be easily understood that if the object under test contains a smaller or larger amount of magnetic material than the reference article, a voltage will also appear across the terminals 10. Thus the voltage across the terminals 10 can be relied upon as a test to identify the object B under test as "false." In other words, with the presence or absence a predetermined amount of voltage across the terminals 10 as a test, we can discriminate between "genuine" and "false" printed matter.

In actual practice, since the voltage appearing across the terminals 10 is very small, an amplifier 11 may advantageously be provided, to the output of which is connected a suitable indicating means or relay 12. If the voltage applied to the amplifier 11 is lower than the level of the noise voltage inherent in the amplifier and other circuit elements, the apparatus will not work properly. In accordance with the invention, however, such possibility is eliminated since the differential transformer makes the magnitude of the voltage across the terminals 10 twice that which would otherwise be resulted.

In the above description, a reference object and an object to be tested are placed in the air-gaps of the two side core legs of the transformer. The arrangement may also be such that with the transformer being so constructed that when there is nothing in the air-gaps, the outputs of the two windings are offset to product a substantially zero voltage across the terminals 10 as before, an object to be tested is inserted into either one of the air-gaps to see if there will appear any voltage across the terminals 10. In this arrangement, if the object under test contains no magnetic material, no voltage will appear across the terminals 10. On the contrary, if it contains any amount of magnetic material, a voltage corresponding to the amount will appear across the terminals 10. Thus, by previously knowing the magnitude of the voltage which appears across the terminals when a "genuine" article is placed in the air-gap 28 or 29, it is possible to identify an object under test as "genuine" or "false."

FIG. 3 shows another embodiment of the invention, wherein a differential transformer 21 has a middle core leg 22 with an exciting winding 23 on it and a pair of side core legs 24 and 25 on which are wound output windings 26 and 27, respectively. The core legs 24 and 25 are formed with air-gaps 28 and 29, respectively, into which a standard or reference object A and an object to be tested B are to be inserted. The arrangement may also be such that without the reference object, an object to be tested only may be placed in either one of the air gaps 28 and 29, as is possible with the previous embodiment. The operation of this embodiment will be apparent from that of the previous embodiment.

The exciting winding 23 is energized by an alternating current source E, and the output windings 26, 27 are connected to the inputs of full-wave rectifiers 30, 31, respectively. Smoothing condensers 32 and 33 are connected across the outputs of the rectifiers 30 and 31, respectively. A resistor 34 is connected across the condenser 32 and a potentiometer 35 is connected across the condenser 33, with a conductor 36 connecting the zero potential points 37 and 38 of the two circuit elements 34 and 35. Thus, between the opposite end 39 of the resistor 34 and the slider arm 40 of the potentiometer 35, there will appear a direct current voltage which has been converted from an alternating current voltage and whose value is equal to the difference between the outputs of the two windings 26 and 27. The direct current voltage is again converted into an alternating current voltage by means of a chopper 41 and applied through an amplifier 42 to a suitable indicating means or relay 43. The relay may be so arranged that it is operated if the object under test is "genuine," and it is not if the object is "false." The arrangement may also be such that if the object under test is "false," the relay is operated, while if it is "genuine," the relay is not operated.

A servo-motor 44 is provided having its one exciting winding 45 connected to the output of the amplifier 42 and the other exciting winding 46 energized by an alternating current source E'. The slider arm 40 of the potentiometer 35 is mechanically ganged with the rotor 47 of the servo-motor 44 in such a manner that upon rotation of the rotor 47 due to energization of the winding 45, the slider 40 moves just enough to reduce its output to zero. A normally closed switch 48 is interposed between the output of the amplifier 42 and the winding 45 of the servo-motor 44, and a normally open switch 49 is inserted between the output of the amplifier 42 and the relay 43. These switches 48 and 49 are so arranged by any suitable means that when an object to be examined has been inserted into one of the air-gaps of the transformer 21, the switch 48 is opened while the switch 49 is closed. Therefore, so long as nothing is in one or either of the air-gaps, the switch 48 is kept closed while the switch 49 is open so that the winding 45 is ready to be energized by the output of the amplifier 42 while the relay 43 is not in a position to be actuated by that output.

The lengths of the air-gaps 28 and 29 are likely to vary, though very little, with the ambient temperature always acting on the core of the transformer 21. If the variation is the same with both air-gaps 28 and 29, no serious problem will arise. However, if it is not, the outputs of the two windings 26 and 27 will differ from each other, so that a potential will appear at the slider 40, which may be sufficient to cause wrong actuation of the relay 43.

The difficulty has been overcome in the arrangement of FIG. 3 in the following manner: Unless any object to be tested is in one of the air-gaps as previously mentioned, the switch 49 is open to cut off the relay 43 from the output of the amplifier 42, thereby preventing any voltage caused by any difference between the lengths of the air-gaps from being applied to the relay 43 to wrongly actuate it. On the other hand, since the switch 48 is closed so long as the switch 49 is open, such voltage due to any difference between the lengths of the air-gaps is applied to the exciting winding 45 of the servo-motor 44 to rotate its rotor 47. Upon rotation of the rotor, the slider 40 of the potentiometer 35 is adjusted to reduce its output voltage to zero. Thus the apparatus is always kept ready to operate properly, with no signal appearing at the output of the amplifier 42.

Under the condition, when an object to be tested is inserted in one of the air-gaps 28 and 29, the switch 48 opens the circuit to the servo-motor 44, and the switch 49 is closed to make the relay 43 ready to be actuated by the output of the amplifier.

It should be recognized that the embodiments disclosed herein are merely representative and that further modifications and changes can be made without departing from the true scope and spirit of the invention.

What we claim is:

Apparatus for testing printed matter comprising in combination: a differential transformer having an excitation leg and first and second sensing legs with each of said sensing legs having a gap therein for the insertion of printed material; an excitation winding on said excitation leg; first and second sensing windings on said first and second sensing legs, respectively; means including a potentiometer coupled with said sensing windings for balancing the outputs thereof; electric drive means coupled with said potentiometer and with said sensing windings operative when energized by a differential signal from said sensing windings to adjust said potentiometer in a direction to reduce the difference between the signals provided by said first and second windings; indicating means coupled with said first and second windings indicating the difference in the output signals therefrom; and first and second switch means respectively intermediate said drive means and said sensing windings and intermediate said indicating means and said sensing windings, said first switch means being closed only during the absence of an object to be tested in one of said gaps and said second switch means being closed only during the presence of an object to be tested in one of said gaps.

References Cited

UNITED STATES PATENTS

| | | | |
|---|---|---|---|
| 2,331,418 | 10/1943 | Nolde | 324—34 |
| 2,445,455 | 7/1948 | Rights et al. | 324—40 |
| 2,755,433 | 7/1956 | Lease et al. | 324—41 |
| 2,921,298 | 1/1960 | Jackson | 324—34 |
| 3,049,665 | 8/1962 | Hummel | 324—34 |

FOREIGN PATENTS 765,071   1/1957   Great Britain.

RUDOLPH V. ROLINEC, *Primary Examiner.*

WALTER L. CARLSON, *Examiner.*

R. J. CORCORAN, *Assistant Examiner.*